US010201233B2

(12) United States Patent
Grisham et al.

(10) Patent No.: US 10,201,233 B2
(45) Date of Patent: Feb. 12, 2019

(54) MODULAR BASIN APPARATUS

(71) Applicant: David Grisham, Nashville, TN (US)

(72) Inventors: David Grisham, Nashville, TN (US); Patrick Weber, Saint Louis, MO (US)

(73) Assignee: David Grisham, Nashville, TN (US)

( * ) Notice: Subject to any disclaimer, the term of this patent is extended or adjusted under 35 U.S.C. 154(b) by 0 days.

(21) Appl. No.: 15/597,107

(22) Filed: May 16, 2017

(65) Prior Publication Data

US 2017/0314728 A1 Nov. 2, 2017

Related U.S. Application Data

(63) Continuation of application No. 15/143,503, filed on Apr. 29, 2016, now Pat. No. 9,651,191.

(51) Int. Cl.
*A47C 9/10* (2006.01)
*A47C 4/02* (2006.01)
(Continued)

(52) U.S. Cl.
CPC ............... *A47C 9/10* (2013.01); *A47B 3/12* (2013.01); *A47B 13/10* (2013.01); *A47C 4/021* (2013.01);
(Continued)

(58) Field of Classification Search
CPC . A01G 9/10; A01G 9/026; B65D 7/02; B65D 9/12; B65D 11/18; B65D 11/00;
(Continued)

(56) References Cited

U.S. PATENT DOCUMENTS 163,202 A * 5/1875 Houston ............... F24C 3/14
126/38
D163,202 S 5/1875 Houston
(Continued)

FOREIGN PATENT DOCUMENTS

CN 201782346 U 4/2011
CN 204654309 U 9/2015
WO 9801058 1/1998

OTHER PUBLICATIONS

Drifta.com.au, Large Pack and Carry Fire Pit, Nov. 2015, [online], Retrieved Mar. 15, 2017 from <URL:http://www.drifta.com.au/large-pack-and-carry-folding-fire-pit/>.
(Continued)

*Primary Examiner* — Christopher Garft
(74) *Attorney, Agent, or Firm* — Matthew C. Cox; Waller Lansden Dortch & Davis, LLP

(57) ABSTRACT

A modular basin apparatus includes a first panel, a second panel and a third panel. The panels include a plurality of slots that receive portions of the other panels. A user may assemble the panels to form a three-dimensional basin apparatus. A concave cavity is formed on the upper side of the apparatus when assembled, and the cavity may be receive materials depending on the application of the assembly. In some embodiments, the apparatus may be used as a modular fire pit, chair, table, or other device. A fourth panel may rest against the first, second and third panels to provide an upper surface. In some embodiments, all panels include the same planform profile and outer dimensions such that they may be stacked in an arrangement having a uniform outer profile for improved transport and storage.

28 Claims, 6 Drawing Sheets

(51) Int. Cl.
*A47B 3/12* (2006.01)
*A47B 13/10* (2006.01)
*F24B 3/00* (2006.01)
*A01G 9/02* (2018.01)
*A47B 37/04* (2006.01)
*A47B 13/02* (2006.01)

(52) U.S. Cl.
CPC ............... *F24B 3/00* (2013.01); *A01G 9/026* (2013.01); *A47B 37/04* (2013.01); *A47B 2013/026* (2013.01); *A47B 2230/0088* (2013.01)

(58) Field of Classification Search
CPC ......... F24B 1/199; A47B 3/06; A47B 13/003; A47B 3/12; A47B 57/32; A47B 13/00; A47B 37/04; A47B 2013/026; A47B 2230/0088; A47C 4/021; A47F 5/11
USPC ....... 297/440.1, 440.13; 108/158.12, 157.18; 126/30, 305; 248/588, 460, 150, 165, 248/346.3
See application file for complete search history.

(56) References Cited

U.S. PATENT DOCUMENTS

| | | | |
|---|---|---|---|
| 1,940,117 A * | 12/1933 | Carpos | A47B 3/06 108/157.18 |
| 3,447,530 A * | 6/1969 | Benedict | A47J 37/0763 126/25 R |
| 3,698,124 A | 10/1972 | Reitzel et al. | |
| 3,727,979 A | 4/1973 | Schier et al. | |
| 4,532,910 A | 8/1985 | Longley, Jr. | |
| 4,593,950 A * | 6/1986 | Infanti | A47C 3/029 297/130 |
| 5,335,753 A * | 8/1994 | Campbell | B25H 1/06 182/151 |
| 5,992,938 A * | 11/1999 | Jones | A47C 4/021 297/440.13 |
| 6,615,746 B2 * | 9/2003 | Bart | A47B 3/12 108/157.18 |
| 6,851,419 B2 * | 2/2005 | Reiner | F24C 1/16 126/40 |
| D546,114 S | 7/2007 | Reiner | |
| 7,300,110 B1 * | 11/2007 | Debien | A47C 3/0257 297/181 |
| 8,459,205 B1 | 6/2013 | Patt, Jr. et al. | |
| 2003/0173814 A1 | 9/2003 | Wieland et al. | |
| 2012/0204852 A1 | 8/2012 | Boucher | |
| 2016/0309662 A1 * | 10/2016 | Green | A47C 4/021 |

OTHER PUBLICATIONS

Lethal Fabrication, Modern Steel Fire Pit, undated, [online] Retrieved Mar. 15, 2017 from <URL:https://www.etsy.com/listing/128456970/modern-steel-fire-pit-industrial-metal>.
Breathe Bell Tents, Fire Away Fire Pit 'Kindling', Belltent.com.au, [online], Retrieved Mar. 15, 2017 from <URL:http://www.belltent.com.au/product/fire-away-fire-pit-kindling/>.
International Search Report and Written Opinion for PCT/US2017/027273, dated Jul. 11, 2017, 12 pages.

* cited by examiner

MODULAR BASIN APPARATUS

CROSS-REFERENCES TO RELATED APPLICATIONS

This application is a continuation of U.S. patent application Ser. No. 15/143,503 filed Apr. 29, 2016 entitled MODULAR BASIN APPARATUS of which is herein incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to modular devices that can be assembled and disassembled by a user to form a useful article. More specifically, the present disclosure relates to an apparatus having a plurality of plates that can be assembled and disassembled by a user to form a device having a central concave basin that may be used to accommodate articles or to form a structural support for items.

In many applications, it may be desirable to provide a modular device that can be assembled and/or disassembled by a user to provide a useful article. In some applications, modular devices are desired because they may include a small form factor when disassembled, but may retain a much larger form factor when assembled into a useful article. A small form factor may be desirable when a user is travelling, transporting the device, storing the device, or generally isn't using the device. When the user desires to use the article for an application, the modular device may be unpacked and assembled to form the useful article.

Modular devices of this nature are used for a variety of applications, for example in gardening as flower pots or planters, as furniture for seating or storage, or for other applications such as a portable fire pit or grill for receiving items such as firewood.

Conventional modular devices for assembly and/or disassembly by a user are often bulky and are not easily assembled at a desired location. What is needed then are improvements in modular devices for allowing assembly and/or disassembly by a user for the purpose of forming useful article.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is to provide a modular basin apparatus including a central cavity shaped to receive items. The modular basin apparatus includes a first panel, a second panel and a third panel. Each panel includes one or more slots shaped to receive a portion of another panel. A user may assemble the apparatus using the slots to receive portions of the other panels, forming a three dimensional standing apparatus with central cavity positioned to receive one or more items. The apparatus may be used as a fire pit or grill in some embodiments.

Another aspect of the present disclosure is to provide a modular basin apparatus having first, second and third panels each having the same planform profile such that the panels may be stacked for transport or storage.

A further aspect of the present disclosure is to provide a modular basin apparatus having an additional fourth panel to provide an upper surface supported by the first, second and third panels.

Yet another aspect of the present disclosure is to provide a modular basin apparatus having first, second and third panels with slots that may be collinearly aligned to allow a user to assemble the apparatus.

Another aspect of the present disclosure is to provide a modular basin apparatus that may be assembled to provide a three-dimensional structure, and disassembled by a user to provide a flat stack of two-dimensional panels.

In some embodiments, the present disclosure provides a modular fire pit apparatus, including a first panel, a second panel and a third panel. The first panel includes a first panel lower edge, a first panel primary edge, and a first panel secondary edge. The first panel is in the shape of an equilateral triangle with truncated corners, forming a six-sided polygon having a first planform profile. The second panel includes a second panel lower edge, a second panel primary edge, and a second panel secondary edge. The second panel is in the shape of an equilateral triangle with truncated corners, forming a six-sided polygon having a second planform profile. The third panel includes a third panel lower edge, a third panel primary edge, and a third panel secondary edge. The third panel is in the shape of an equilateral triangle with truncated corners, forming a six-sided polygon having a third planform profile. In some embodiments, the first, second and third planform profiles are substantially the same. The first, second and third panels may be modularly assembled by a user using one or more slots on each panel.

Numerous other objects, advantages and features of the present disclosure will be readily apparent to those of skill in the art upon a review of the following drawings and description of a preferred embodiment.

DETAILED DESCRIPTION

Figure 1:
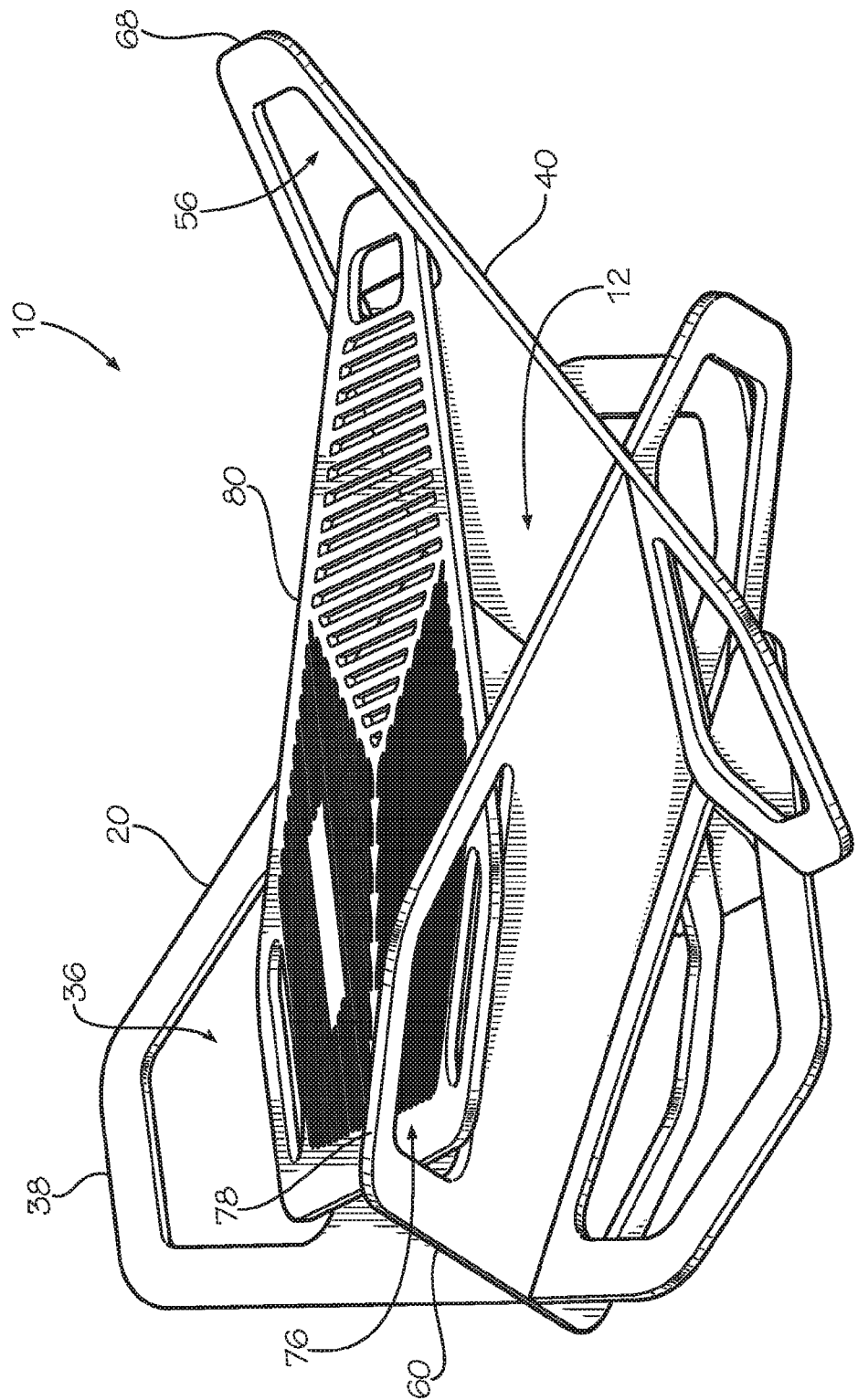
FIG. 1 illustrates a perspective view of an embodiment of a modular basin in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring further to the drawings, FIG. 1 illustrates an embodiment of a modular basin 10 including a first panel 20, a second panel 40 and a third panel 60. First, second and third panels 20, 40, 60 are joined together via a series of interconnecting slots to form an upright structure in the form of modular basin 10. Each slot extends entirely through the thickness of the panel on which the slot is defined. First, second and third panels 20, 40, 60 each includes a substantially flat plate in some embodiments. Each panel can include any suitable material, such as but not limited to metal, steel, aluminum, titanium, plastic, polymer, acrylic, plexi-glass, glass, composite, graphite, stone, wood, paper, cardboard or any other suitable material. Each panel generally includes a sufficient thickness to allow basin 10 to stand on a flat or uneven surface in a generally upright position, as shown in FIG. 1.

When first, second and third panels 20, 40, 60 are joined together, a central cavity 12 is formed on the upper side of the panel assembly. Cavity 12 includes an open concave depression in the center of the assembly. Cavity 12 is generally shaped to allow one or more objects to be placed in the cavity 12. For example, in some embodiments, modular basin 10 includes first, second and third panels 20, 40, 60 joined to form a central cavity 12 to be used as a modular fire pit for receiving and burning firewood or some other combustible fuel such as charcoal or wood chips received in cavity 12. In such embodiments, a fourth plate 80 may be positioned above the central cavity 12 to provide a grilling or cooking surface, as shown in FIG. 1.

Figure 2:
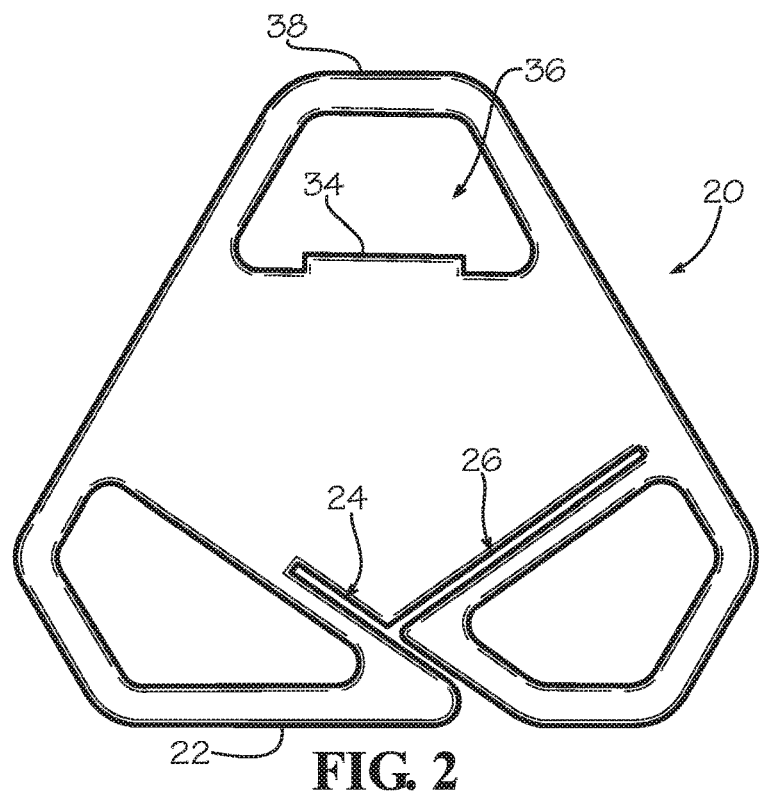
FIG. 2 illustrates a plan view of an embodiment of a first panel in accordance with the present disclosure.

Modular basin 10 generally includes a first panel 20, as shown in FIG. 2 in the form of a substantially flat plate. First panel 20 includes a first panel lower edge 22, and a first panel primary slot 24 is defined in first panel 20 beginning along first panel lower edge 22 and extending into the body of first panel 20 at a generally acute angle. A first panel secondary slot 26 is defined in first panel 20 intersecting the first panel primary slot 24 at a position along the length of first panel primary slot 24. First panel secondary slot 26 is longer that first panel primary slot 24 in some embodiments. First panel primary slot 24 and first panel secondary slot 26 are oriented at an obtuse angle open to the upward direction, as shown in FIG. 2 in some embodiments. Each of first panel primary slot 24 and first panel secondary slot 26 include a slot width substantially equal to the thickness of second and third plates 40, 60 in some embodiments.

Referring further to FIG. 2, in some embodiments, first panel 20 includes the shape of an equilateral triangle with truncated corners, forming a clipped triangle. First panel 20 includes a first panel handle 38 in some embodiments that allows a user to lift first panel 20 in an upright orientation. A first panel handle opening 36 is formed adjacent first panel handle 38 to allow a user's hand to pass through the panel when grasping first panel handle 38.

Figure 3:
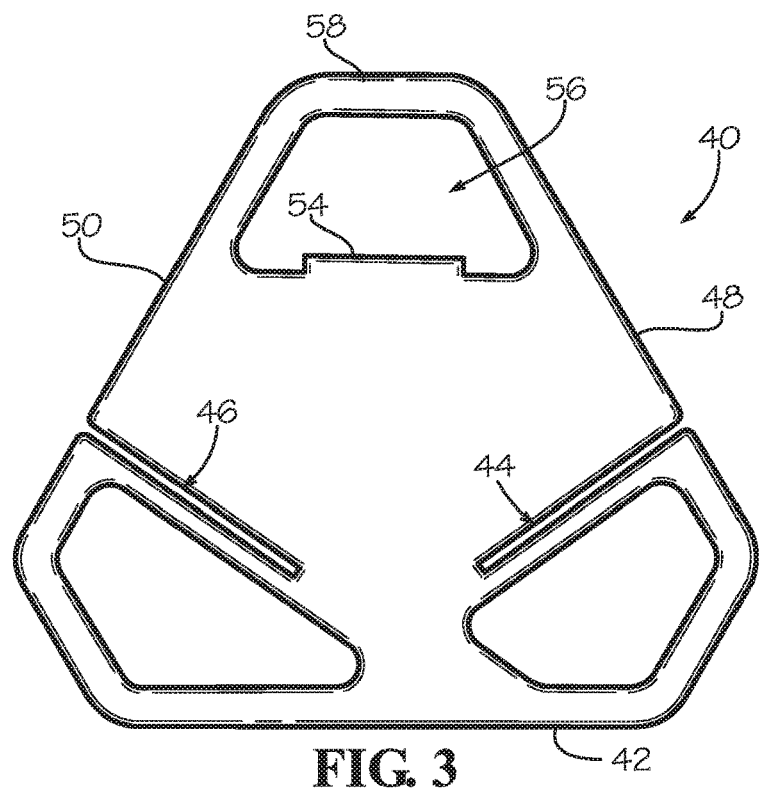
FIG. 3 illustrates a plan view of an embodiment of a second panel in accordance with the present disclosure.

Second panel 40 includes a second panel lower edge 42 positioned at a lower edge of second panel 40 in some embodiments. Second panel lower edge 42 includes the edge of second panel 40 that is positioned to engage a surface upon which modular basin 10 rests, such as the ground. Second panel 40 also includes a second panel primary edge 48 and a second panel secondary edge 50. A second panel primary slot 44 is defined in second panel 40 beginning along the second panel primary edge 48, as shown in FIG. 3 in some embodiments. Second panel primary slot 44 includes a slot that extends from the second panel primary edge 48 inwardly toward the body of second panel 44. Similarly, second panel 40 also includes a second panel secondary slot 46 defined in second panel 40 beginning along the second panel secondary edge 50 and extending inwardly toward the body of second panel 44. Second panel primary slot 44 and second panel secondary slot 46 do not intersect. In some embodiments, second panel primary slot 44 and second panel secondary slot 46 are equal in length. In additional embodiments, second panel primary slot 44 and second panel secondary slot 46 are equal in both length and in angle relative to a vertical reference axis. In other embodiments, second panel primary slot 44 and second panel secondary slot 46 are unequal in length. Each of second panel primary slot 44 and second panel secondary slot 46 include a slot width that is substantially equal to the thickness of first panel 20 and third panel 60.

Referring further to FIG. 3, in some embodiments, second panel 40 includes the shape of an equilateral triangle with truncated corners, forming a clipped triangle. Second panel 40 includes a second panel handle 58 in some embodiments that allows a user to lift second panel 40 in an upright orientation. A second panel handle opening 56 is formed adjacent second panel handle 58 to allow a user's hand to pass through the panel when grasping second panel handle 58.

Figure 4:
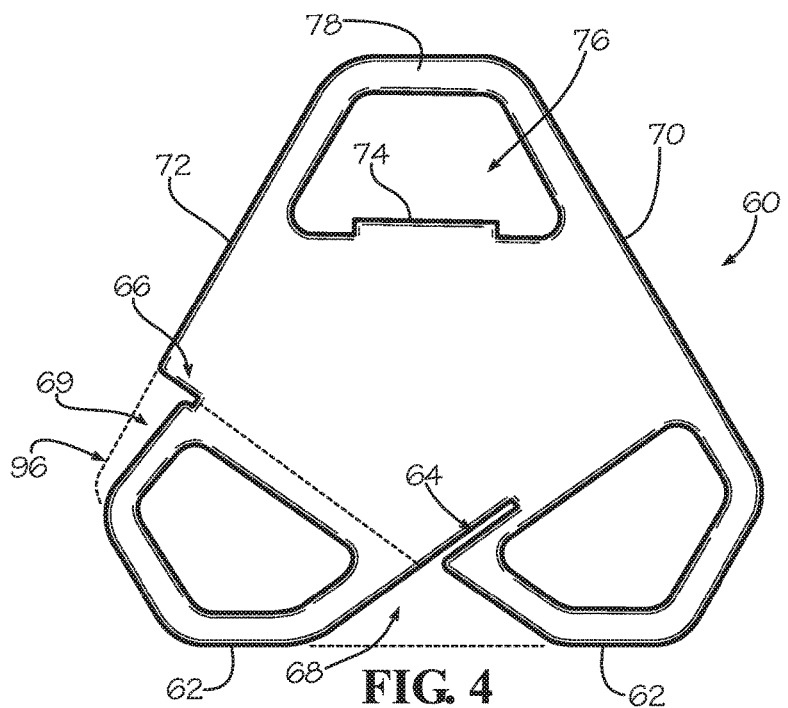
FIG. 4 illustrates a plan view of an embodiment of a third panel in accordance with the present disclosure.

Referring to FIG. 4 in some embodiments a third panel 60 includes a substantially flat plate having a third panel lower edge 62 defined along the lower edge of third panel 60. Third panel lower edge 62 is positioned to engage the surface or structure upon which assembled modular basin 10 rests, such as a ground surface. Third panel 60 includes a third panel primary recess 68 defined along the third panel lower edge 62, and a third panel primary slot 64 is defined in third panel 60 beginning along the lower edge 62 in the third panel primary recess 68 and extending into the body of third panel 60, as shown in FIG. 4. Third panel primary slot 64 is generally oriented at an obtuse angle relative to a horizontal reference axis open to the left side of the third panel 60 as shown in FIG. 4. Third panel 60 includes a third panel primary edge 70 and a third panel secondary edge 72 opposite the third panel primary edge 70. A third panel secondary recess 69 is defined along the third panel secondary edge 72, and a third panel secondary slot 66 is defined in the third panel 60 beginning in the third panel secondary recess 69 and extending into the body of third panel 60, as shown in FIG. 4. Third panel secondary slot 66 is shorter in length than third panel primary slot 64 in some embodiments.

Referring further to FIG. 4, in some embodiments, third panel 60 includes the shape of an equilateral triangle with truncated corners, forming a clipped triangle. Third panel 60 includes a third panel handle 78 in some embodiments that allows a user to lift third panel 60 in an upright orientation. A third panel handle opening 76 is formed adjacent third panel handle 78 to allow a user's hand to pass through the panel when grasping third panel handle 78.

Figure 5:
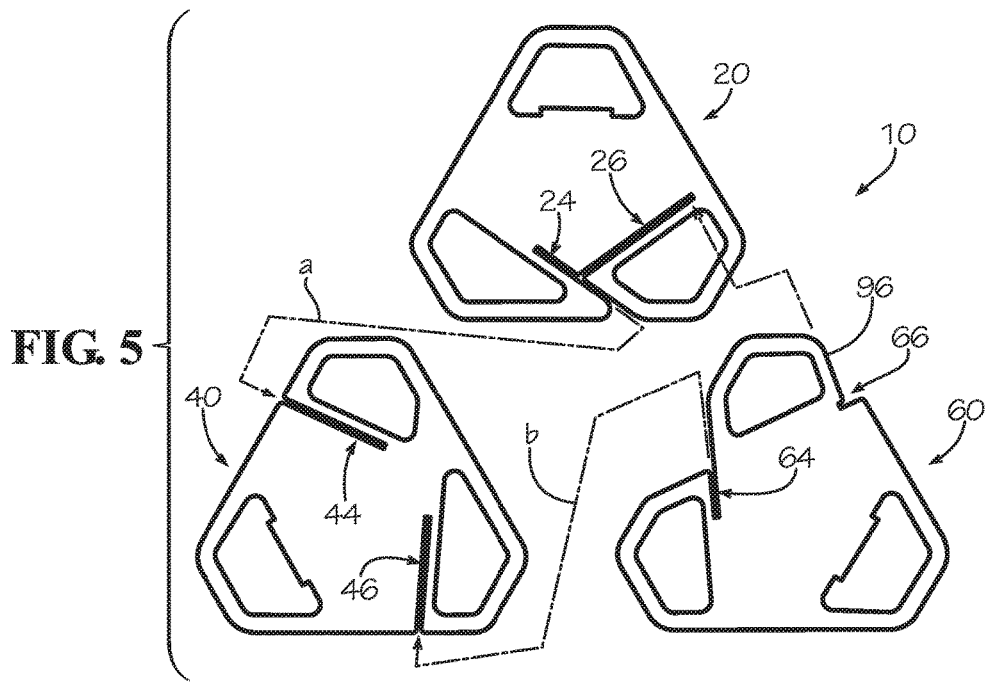
FIG. 5 illustrates a plan view an embodiment of first, second and third panels arranged for assembly in accordance with the present disclosure.

Referring further to FIG. 4, a portion of third panel 60 at the intersection of third panel secondary edge 72 and third panel lower edge 62 includes an insert portion 96 forming a flange that is dimensioned to be inserted through first panel secondary slot 26 on first panel 20, as shown in FIG. 5. Referring further to FIG. 5, each of the first, second and third panels 20, 40, 60 are configured to be interconnected to form modular basin 10. The assembly of first, second and third panels 20, 40, 60 may be accomplished by a user who manually combines the panels to form modular basin 10. Similarly, a user may manually disconnect first, second and third panels 20, 40, 60 from each other to disassemble modular basin 10. As seen in FIG. 4, first panel 20 is positioned relative to second panel 40 such that first panel primary slot 24 is collinearly aligned with and receives second panel primary slot 44, as shown in line "a". As the first panel primary slot 24 and second panel primary slot 44 pass each other in a collinear orientation, a portion of second panel 40 is received in first panel primary slot 24, and a portion of first panel 20 is received in second panel primary slot 44.

Next, as shown by line "b" in FIG. 5, third panel 60 is positioned relative to first and second panels 20, 40 such that third panel primary slot 64 is collinearly aligned with second panel secondary slot 46. In this position, insert portion 96 of third panel 60 is also aligned for insertion into first panel secondary slot 26. Once aligned, third panel 60 can be moved toward first and second panels 20, 60 such that insert portion 96 is received in and passes through first panel secondary slot 96 while third panel primary slot 64 is collinearly passes second panel secondary slot 46. As third panel 60 advances, a portion of second panel 40 is received in third panel primary slot 64, and a portion of third panel 60 is received in second panel secondary slot 46. Third panel 60 is advanced until third panel secondary slot 66 rests against the surface of first panel 20, providing a translation stop for third panel 60. Once the first, second and third panels 20, 40, 60 are combined in this manner, a central cavity 12 is formed, and the modular basin apparatus may stand upright, as shown in FIG. 1.

Figure 6:
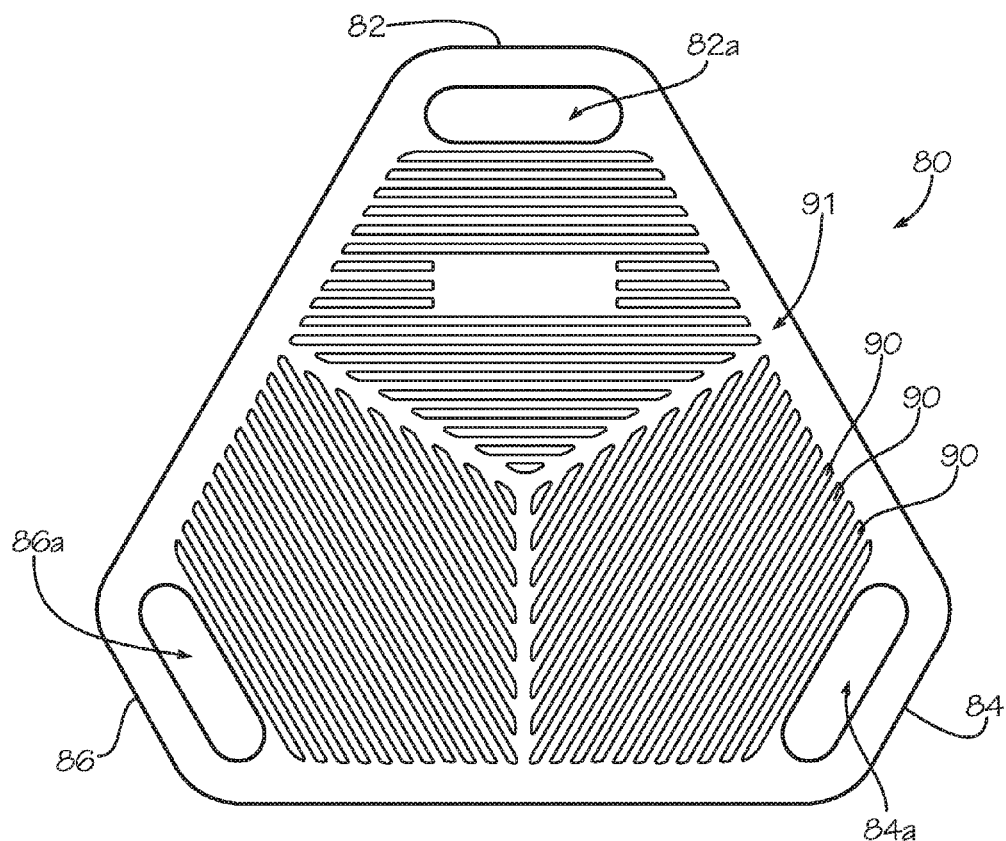
FIG. 6 illustrates a plan view of an embodiment of a fourth panel in accordance with the present disclosure.
Figure 7:
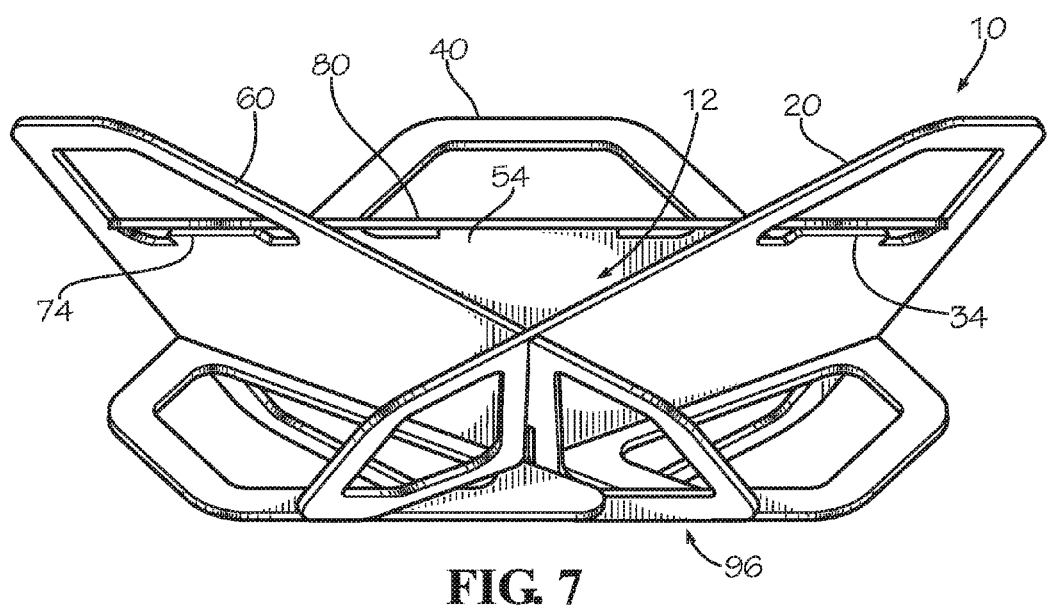
FIG. 7 illustrates an elevation view of an embodiment of a modular basin apparatus in accordance with the present disclosure.

Referring to FIG. 6, in some embodiments, a fourth panel 80 is provided. Fourth panel 80 may be positioned above the central cavity 12 supported by first, second and third panels 20, 40, 60 as shown in FIG. 1. Fourth panel 80 may provide a surface against which items may be rested, for example a sitting surface in embodiments where modular basin apparatus 10 is used to for a chair or stool. Alternatively, fourth panel 80 may be positioned above central cavity 12 to provide a cooking or grilling surface where modular basin apparatus 10 is used as a portable fire pit or portable cooking device such as a grill. As shown in FIG. 6, fourth panel 80 includes a cooking surface 91 including a plurality of passages 90 to allow passage of flames and/or heat from below. Fourth panel 80 can have numerous different configurations including a substantially solid panel in some embodiments.

Figure 8:
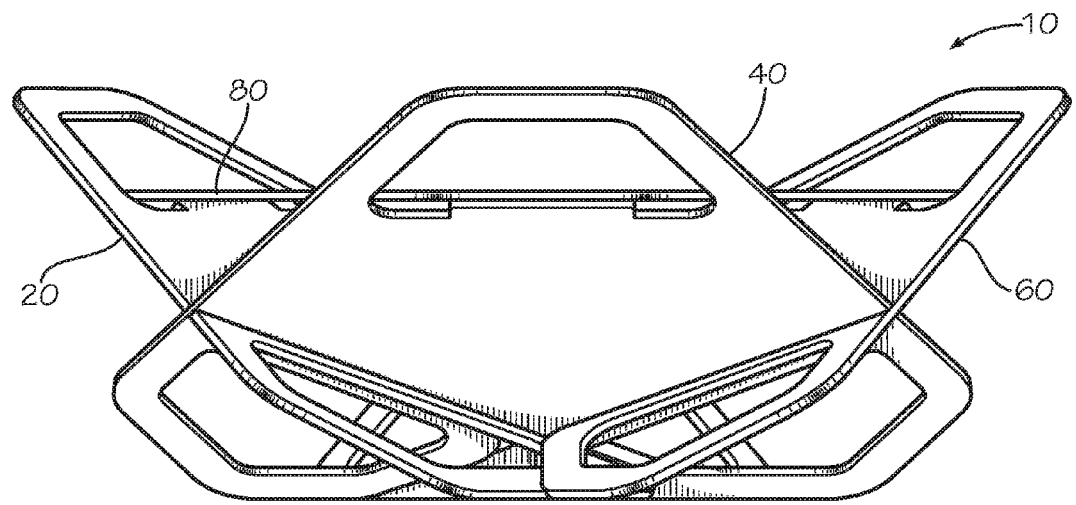
FIG. 8 illustrates an elevation view of an embodiment of a modular basin in accordance with the present disclosure.

Referring further to FIG. 8, in some embodiments, fourth panel 80 includes the shape of an equilateral triangle with truncated corners, forming a clipped triangle. Fourth panel 80 includes a support at each corner in some embodiments. Each support provides a contact location for fourth panel 80 to be supported by one of the first, second and third panels 20, 40, 60. As shown in FIG. 6, in some embodiments, fourth panel 80 includes a fourth panel first support 82 in a first corner of fourth panel 80, a fourth panel second support 84 in a second corner of fourth panel 80, and a fourth panel third support 86 in a third corner of fourth panel 80. A fourth panel first opening 82a is defined in fourth panel 80 adjacent fourth panel first support 82. A fourth panel second opening 84a is defined in fourth panel 80 adjacent fourth panel second support 84. A fourth panel third opening 86a is defined in fourth panel adjacent fourth panel third support 86. Each of the fourth panel first, second and third supports 82, 84, 86 may be used as a handle to allow user to grasp fourth panel to be carried in an upright orientation.

In some embodiments, first panel 20, second panel 40, third panel 60, and fourth panel 80 include substantially the same planform profile, each including an equilateral triangle with truncated corners. Each panel in some embodiments also includes substantially the same outer dimensions. As such, when first panel 20, second panel 40, third panel 60, and fourth panel 80 are disassembled, each panel may be stacked against one another to form a single stack of four panels having substantially the same outer planform profile and outer dimensions. When stacked, first handle 38, second handle 58 and third handle 78 are substantially aligned. Additionally, when stacked first panel handle opening 36, second panel handle opening 56, and third panel handle opening 76 are substantially aligned. This alignment allows a user to simultaneously grasp first, second and third handles 38, 58, and 78 while simultaneously passing the user's fingers through first panel handle opening 36, second panel handle opening 56, and third panel handle opening 76. Fourth panel 80 may also be added to the stack by placing any one of the openings 82a, 84a, 86a on fourth panel 80 in alignment with first panel handle opening 36, second panel handle opening 56, and third panel handle opening 76.

In additional embodiments, first, second, third and fourth panels 20, 40, 60, 80 may be formed using a raw material. In alterative embodiments, first, second, third and fourth panels 20, 40, 60, 80 include a surface treatment such as an application of a polymer, ceramic, porcelain, enamel, glaze, paint or other surface coating or treatment.

Referring further to FIG. 2, first panel 20 includes a first panel support tab 34 protruding from first panel 20 into first panel handle opening 36. First panel support tab 34 includes a substantially rectangular protrusion extending partially into first panel handle opening 36 in some embodiments. Similarly, second panel 40 includes a second panel support tab 54 protruding from second panel 40 into second panel handle opening 56 in some embodiments. Second panel support tab 56 includes a substantially rectangular protrusion extending partially into second panel handle opening 56 in some embodiments. Third panel 60 also includes a third panel support tab 74 extending from third panel 60 into third panel handle opening 76 in some embodiments. Third panel support tab 74 includes a substantially rectangular protrusion extending partially into third panel handle support opening 76 in some embodiments.

Figure 9:
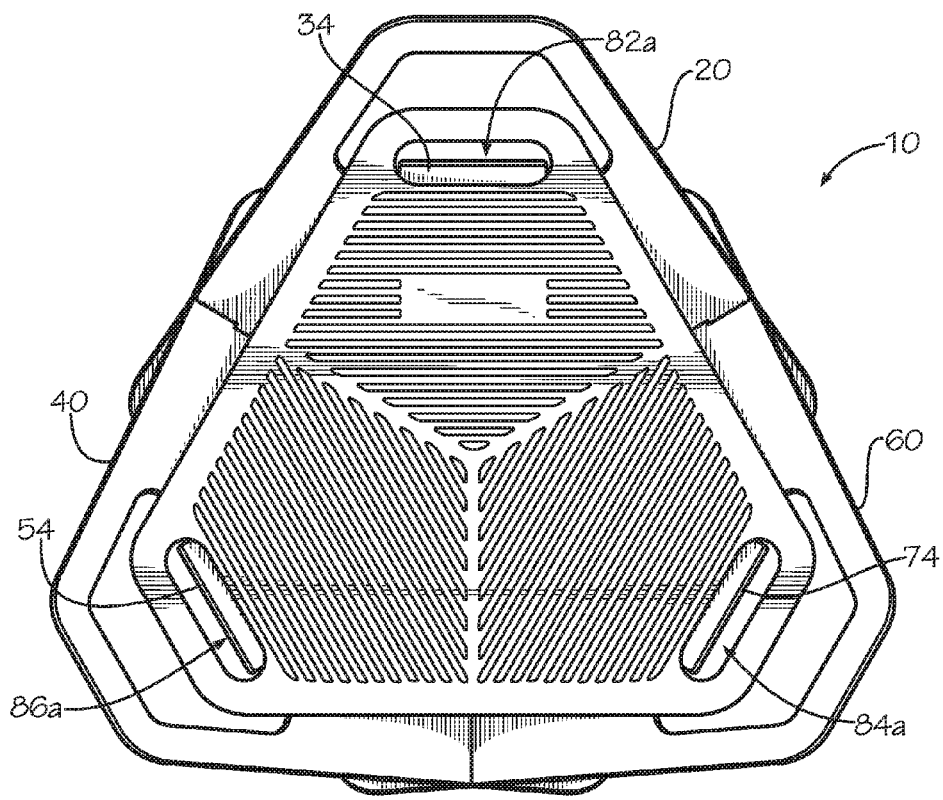
FIG. 9 illustrates a top view of an embodiment of a modular basin in accordance with the present disclosure.

Each support tab 34, 54, 75 provides an engagement with a corresponding location on fourth panel 80 in some embodiments to keep fourth panel 80 centered above central cavity 12 when fourth panel 80 is positioned on modular basin apparatus 10. First panel support tab 34 is partially received in fourth panel first opening 82a, second panel support tab 54 is partially received in fourth panel third opening 86a, and third panel support tab 74 is partially received in fourth panel second opening 84a in some embodiments, as seen in FIG. 9. In other embodiments, different support tabs may be received in different openings on fourth panel 80, as fourth panel 80 may be rotated relative to modular basin apparatus 10.

Figure 10:
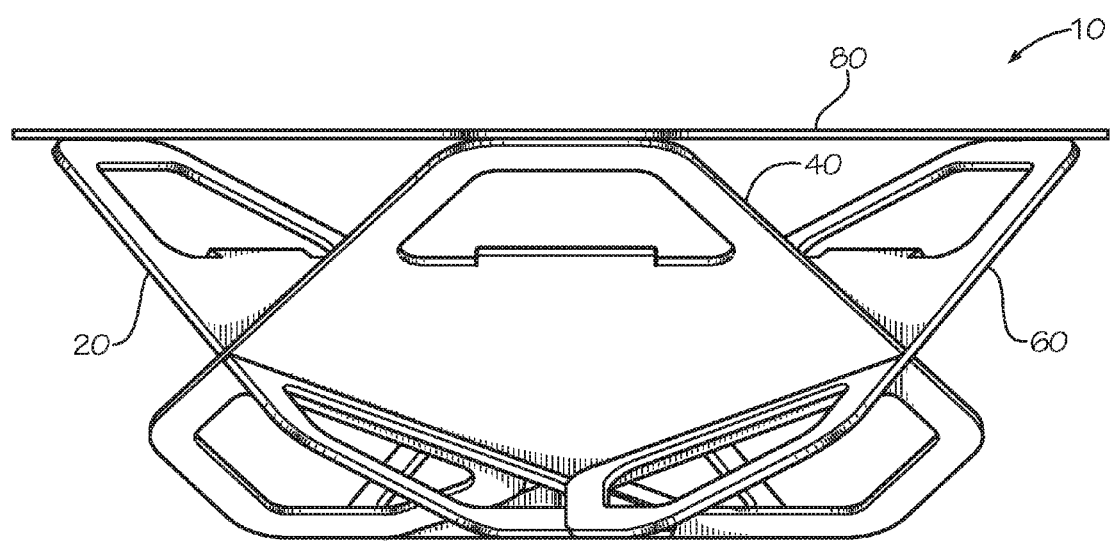
FIG. 10 illustrates an elevation view of an alternative embodiment of a modular basin in accordance with the present disclosure.

In alternative embodiments, as seen in FIG. 10, fourth panel 80 may rest against the top edge of each of first, second and third panels 20, 40, 60. As such, fourth panel 80 may be dimensioned with a larger planform profile than first, second and third panels 20, 40, 60 in some embodiments.

In various applications, modular basin apparatus 10 including first panel 20, second panel 40 and third panel 60 provides a modular structure that can be easily assembled and disassembled by a user. Modular basin apparatus 10 may be used for such purposes as for a fire pit, grill, fire bowl, stool, chair, table, decorative planter, display device, storage device, feeding trough, wash basin, bird bath, presentation device, or an apparatus for storing particulates, solids or liquids such as a bowl.

Thus, although there have been described particular embodiments of the present invention of a new and useful MODULAR BASIN APPARATUS is not intended that such references be construed as limitations upon the scope of this invention.

What is claimed is:

1. A modular basin apparatus, comprising:
   a first panel having a first panel lower edge, a first panel primary slot defined in the first panel extending from the first panel lower edge into the first panel, the first panel including a first panel secondary slot defined in the first panel extending from the first panel primary slot and extending into the first panel;
   a second panel having a second panel lower edge, a second panel primary edge, and a second panel secondary edge, the second panel including a second panel primary slot extending from the second panel primary edge into the second panel, and the second panel including a second panel secondary slot extending from the second panel secondary edge into the second panel, wherein the second panel primary slot and the second panel secondary slot do not intersect;
   a third panel having a third panel lower edge and a third panel first recess defined in the third panel adjacent the third panel lower edge, the third panel defining a third panel primary slot defined through the third panel extending from the third panel primary recess into the third panel; and
   an insert portion defined on the third panel, wherein the insert portion of the third panel extends through the first panel secondary slot when the first, second and third panels are assembled,
   wherein the first panel primary slot is collinearly aligned with the second panel primary slot, and the third panel primary slot is collinearly aligned with the second panel secondary slot when the first, second and third panels are assembled, and
   wherein the first panel secondary slot intersects the first panel primary slot.

2. The apparatus of claim 1, further comprising a first panel handle defined on the first panel, and a first panel handle opening defined on the first panel adjacent the first panel handle.

3. The apparatus of claim 2, further comprising a second panel handle defined on the second panel, and a second panel handle opening defined on the second panel adjacent the second panel handle.

4. The apparatus of claim 3, further comprising a third panel handle defined on the third panel, and a third panel handle opening defined on the third panel adjacent the third panel handle.

5. The apparatus of claim 4, further comprising a first panel support tab extending from the first panel into the first panel handle opening.

6. The apparatus of claim 5, further comprising a second panel support tab extending from the second panel into the second panel handle opening.

7. The apparatus of claim 6, further comprising a third panel support tab extending from the third panel into the third panel handle opening.

8. The apparatus of claim 7, further comprising a central cavity defined on the upper side of the first, second and third panels when assembled.

9. The apparatus of claim 8, further comprising a fourth panel positioned above the central cavity.

10. The apparatus of claim 9, further comprising a fourth panel first support, a fourth panel second support, and a fourth panel third support defined on the fourth panel.

11. The apparatus of claim 10, wherein the fourth panel first support is received in the first panel handle opening, the fourth panel second support is received in the second panel handle opening, and the fourth panel third support is received in the third panel handle opening.

12. The apparatus of claim 11, wherein the first panel support tab engages the fourth panel first support, the second panel support tab engages the fourth panel second support, and the third panel support tab engages the fourth panel third support.

13. The apparatus of claim 1, wherein each of the first panel, second panel and third panel include triangular profiles.

14. The apparatus of claim 13, wherein each of the first panel, and the second panel include the same outer dimensions and the third panel includes substantially the same outer dimensions as the first panel and the second panel.

15. The apparatus of claim 14, wherein the fourth panel includes a substantially similar triangular profile and outer dimensions as the first panel, and the second panel.

16. A modular basin apparatus, comprising:
   a first panel having a first panel lower edge, a first panel primary slot defined in the first panel extending from the first panel lower edge into the first panel, the first panel including a first panel secondary slot defined in the first panel extending from the first panel primary slot and extending into the first panel;
   a second panel having a second panel lower edge, a second panel primary edge, and a second panel secondary edge, the second panel including a second panel primary slot extending from the second panel primary edge into the second panel, and the second panel including a second panel secondary slot extending from the second panel secondary edge into the second panel, wherein the second panel primary slot and the second panel secondary slot do not intersect;

a third panel having a third panel lower edge and a third panel first recess defined in the third panel adjacent the third panel lower edge, the third panel defining a third panel primary slot defined through the third panel extending from the third panel primary recess into the third panel;

a first panel handle defined on the first panel, and a first panel handle opening defined on the first panel adjacent the first panel handle; and a second panel handle defined on the second panel, and a second panel handle opening defined on the second panel adjacent the second panel handle, wherein the first panel primary slot is collinearly aligned with the second panel primary slot, and the third panel primary slot is collinearly aligned with the second panel secondary slot when the first, second and third panels are assembled, and wherein the first panel secondary slot intersects the first panel primary slot.

17. The apparatus of claim 16, further comprising a third panel handle defined on the third panel, and a third panel handle opening define don the third panel adjacent the third panel handle.

18. The apparatus of claim 17, further comprising a first panel support tab extending from the first panel into the first panel handle opening.

19. The apparatus of claim 18, further comprising a second panel support tab extending from the second panel into the second panel handle opening.

20. The apparatus of claim 19, further comprising a third panel support tab extending from the third panel into the third panel handle opening.

21. The apparatus of claim 20, further comprising a central cavity defined on the upper side of the first, second and third panels when assembled.

22. The apparatus of claim 21, further comprising a fourth panel positioned above the central cavity.

23. The apparatus of claim 22, further comprising a fourth panel first support, a fourth panel second support, and a fourth panel third support defined on the fourth panel.

24. The apparatus of claim 23, wherein the fourth panel first support is received in the first panel handle opening, the fourth panel second support is received in the second panel handle opening, and the fourth panel third support is received in the third panel handle opening.

25. The apparatus of claim 24, wherein the first panel support tab engages the fourth panel first support, the second panel support tab engages the fourth panel second support, and the third panel support tab engages the fourth panel third support.

26. A modular basin apparatus, comprising:

a first panel having a first panel lower edge, a first panel primary slot defined in the first panel extending from the first panel lower edge into the first panel, the first panel including a first panel secondary slot defined in the first panel extending from the first panel primary slot and extending into the first panel;

a second panel having a second panel lower edge, a second panel primary edge, and a second panel secondary edge, the second panel including a second panel primary slot extending from the second panel primary edge into the second panel, and the second panel including a second panel secondary slot extending from the second panel secondary edge into the second panel, wherein the second panel primary slot and the second panel secondary slot do not intersect; and a third panel having a third panel lower edge and a third panel first recess defined in the third panel adjacent the third panel lower edge, the third panel defining a third panel primary slot defined through the third panel extending from the third panel primary recess into the third panel, wherein the first panel primary slot is collinearly aligned with the second panel primary slot, and the third panel primary slot is collinearly aligned with the second panel secondary slot when the first, second and third panels are assembled, wherein the first panel secondary slot intersects the first panel primary slot, and wherein each of the first panel, second panel and third panel include triangular profiles.

27. The apparatus of claim 26, wherein each of the first panel, and the second panel include the same outer dimensions and the third panel includes substantially the same outer dimensions as the first panel and the second panel.

28. The apparatus of claim 27, wherein the fourth panel includes a substantially similar triangular profile and outer dimensions as the first panel, and the second panel.

* * * * *